United States Patent
Dai et al.

(10) Patent No.: US 9,254,567 B2
(45) Date of Patent: Feb. 9, 2016

(54) SYSTEM FOR COMMANDING A ROBOT

(71) Applicant: ABB Technology AG, Zurich (CH)

(72) Inventors: Fan Dai, Zwingenberg (DE); Oliver Becker, Schriesheim (DE)

(73) Assignee: ABB TECHNOLOGY AG, Zurich (CH)

( * ) Notice: Subject to any disclaimer, the term of this patent is extended or adjusted under 35 U.S.C. 154(b) by 67 days.

(21) Appl. No.: 14/165,161

(22) Filed: Jan. 27, 2014

(65) Prior Publication Data

US 2014/0142754 A1    May 22, 2014

Related U.S. Application Data

(63) Continuation of application No. PCT/EP2011/003754, filed on Jul. 27, 2011.

(51) Int. Cl.
*B25J 9/00* (2006.01)
*B25J 9/16* (2006.01)
*G05B 19/05* (2006.01)

(52) U.S. Cl.
CPC *B25J 9/16* (2013.01); *G05B 19/056* (2013.01)

(58) Field of Classification Search
CPC combination set(s) only.
See application file for complete search history.

(56) References Cited

U.S. PATENT DOCUMENTS

| | | | |
|---|---|---|---|
| 4,912,383 A | 3/1990 | Takeyama et al. | |
| 4,925,312 A * | 5/1990 | Onaga | B25J 9/1633 318/568.22 |
| 5,825,655 A | 10/1998 | Nakagawa et al. | |
| 6,308,113 B1 * | 10/2001 | Nowlin | B25J 9/1689 700/245 |
| 6,341,243 B1 * | 1/2002 | Bourne | B21D 5/02 700/145 |
| 6,453,210 B1 * | 9/2002 | Belotserkovskiy | G06Q 10/06 700/116 |
| 8,290,624 B2 * | 10/2012 | Hjornet | B25J 15/0616 414/737 |
| 8,483,882 B2 * | 7/2013 | Abdallah | H01R 13/17 700/245 |
| 8,560,118 B2 * | 10/2013 | Greer | A61B 19/201 700/247 |
| 8,577,538 B2 * | 11/2013 | Lenser | G05D 1/0251 701/2 |
| 8,831,779 B2 * | 9/2014 | Ortmaier | 318/590 |
| 8,996,166 B2 * | 3/2015 | Jenkinson | G06F 3/0418 345/174 |

(Continued)

FOREIGN PATENT DOCUMENTS

| | | |
|---|---|---|
| EP | 0 227 304 A2 | 7/1987 |
| WO | WO 2012/097834 A2 | 7/2012 |
| WO | WO 2012/097835 A2 | 7/2012 |

OTHER PUBLICATIONS

International Search Report (PCT/ISA/210) mailed on May 4, 2012, by the European Patent Office as the International Searching Authority for International Application No. PCT/EP2011/003754.

(Continued)

*Primary Examiner* — Jonathan L Sample
(74) *Attorney, Agent, or Firm* — Buchanan Ingersoll & Rooney PC

(57) ABSTRACT

A system and method for commanding a robot by a programmable logic controller are disclosed. The system can include a programmable logic controller, at least two function blocks with at least one input for triggering an execution of a PLC function and at least one output indicating status of a function block. Each function block corresponds to a movement segment of a movement path of a robot to be commanded. A command queue can store and send orchestrated robot commands to the robot. Backwards motion of the robot can be performed by stopping execution of not yet executed robot commands for forward motion, and sequentially resending at least one executed robot command stored in the command queue in a contrawise sequence.

14 Claims, 2 Drawing Sheets

(56) References Cited

U.S. PATENT DOCUMENTS

| | | | |
|---|---|---|---|
| 2004/0151636 A1* | 8/2004 | Hsu | B01L 3/0265 422/400 |
| 2006/0287769 A1* | 12/2006 | Yanagita | B25J 9/1669 700/245 |
| 2007/0030271 A1* | 2/2007 | Kamiya | B25J 9/1664 345/442 |
| 2007/0193798 A1* | 8/2007 | Allard | G05D 1/0246 180/169 |
| 2010/0198402 A1* | 8/2010 | Greer | A61B 19/201 700/247 |
| 2010/0305758 A1* | 12/2010 | Nishi | B23Q 17/00 700/264 |
| 2011/0054689 A1* | 3/2011 | Nielsen | G05D 1/0088 700/258 |

OTHER PUBLICATIONS

Marcello Bonfe et al., "PLC-Based Control of a Robot Manipulator With Closed Kinematic Chain", 2009 IEEE International Conference on Robotics and Automation, May 12-17, 2009, pp. 1262-1267, XP-031509515.

* cited by examiner

SYSTEM FOR COMMANDING A ROBOT

RELATED APPLICATION(S)

This application claims priority as a continuation application under 35 U.S.C. §120 to PCT/EP2011/003754, which was filed as an International Application on Jul. 27, 2011, designating the U.S. The entire content of this application is hereby incorporated by reference in its entirety.

FIELD

The disclosure relates to a system for commanding a robot by a programmable logic controller (PLC), which includes a programmable logic controller, at least two function blocks with at least one input for triggering an execution of a belonging PLC function and at least one output indicating the status of the belonging function block. Each function block corresponds to a movement segment of a movement path of the robot to be commanded, a robot controller interface, which can orchestrate the function blocks currently in execution into a robot command and a command queue, which can store the orchestrated robot commands and send them sequentially to the robot.

BACKGROUND INFORMATION

It is known, that robots can be used in industrial applications, such as pick and place, machine tending and palletizing. Several robots can be working together along a common production line, where each robot can perform a certain production step. The overall control of those robots can by realized by a system, which can be based on a programmable logic controller (PLC). The programmable logic controller can coordinate the triggering of the working sequences of the different robots dependent, for example, on the position of a conveyor system, where a workpiece to be assembled can be transported along the different working positions of the robots. The programming of a PLC can be standardized in a wider manner, for example by IEC 61131, so a person who is skilled in PLC programming can be able to operate a wide range of different PLC controlled production lines concerning this issue. Furthermore, the description of the PLCOpen programming standard provides information about PLC programming, which can be known.

A robot can include a robot manipulator with several degrees of freedom in movement, for example, six or seven, whereas at the end of the robot manipulator, an end effector like a gripper or another tool like a welding gun, for example. A robot manipulator with at least six degrees of freedom in movement can be able to position a belonging tool within each coordinate of its working range in each orientation. Thus, a coordinate along a movement path of the robot tool can include six values, three for the belonging coordinate and three for the belonging orientation. The working range of a robot can depend on the robot can be, for example, within a radius of 1 m to 3 m around the belonging robot base.

Kinematic mechanisms with less degree of freedom in movement such as a machine tool with only two degrees of freedom in movement can be seen as a robot within this disclosure.

The movement of the robot can be controlled by a dedicated robot controller, which includes on the one side a computer system and on the other side several amplifiers for the belonging drives of the robot. Each degree of freedom in movement can include a dedicated drive such as an electrical motor. The desired movement of the robot can be contained within a robot program, which can be stored on the computer system of the robot controller. The movement path can be composed by a sequence of movement sections between given coordinates, which can be specified within the robot program. Thus, a robot program can contain commands with the content "linear move from current coordinate to coordinate [x1, x2, x3, o1, o2, o3] with speed [z]", "linear move from current coordinate to current coordinate+delta [x1, x2, x3, o1, o2, o3] with speed [z] or "circle around coordinate [x1, x2, x3] in plane [y1, y2, y3], start angle [a], end angle [b]". The robot controller calculates the belonging control signals for the different motors, so that the tip of the robot manipulator executes the desired motion. Two or more robots can be controlled by a common robot controller.

The programming of a robot can be a time consuming task. Since each robot manufacturer can provide a different programming language for their robots, the programming effort can also increase if different kinds of robots are installed within the same production line of a manufacturing plant. Systems are known, which can allow the commanding of a robot by PLC. Such systems are described, for example, in patent applications PCT/EP2011/000243 and PCT/EP2011/000244.

Within the known art, the movement operation of the robot respective to the manipulator can be in the direction of the programmed movement path respective of its movement segments. Due to the sequentially linkage of the function blocks, a backwards motion may not be possible. This functionality can be used in some cases, for example after an emergency stop of a robot, where the robot has left the programmed movement path and stopped at a stop position on or outside the movement path. For resuming the robot program, the robot respectively, the tool center point of the robot arm can be moved back from the stop position on or near the programmed path to at least the point of interruption, which can be located on the movement path. Moreover, a movement backwards along one or more movement segments of the programmed movement path can be desirable before resuming the program execution. Also during the manual teaching of a robot program using PLC such a backward movement can be used.

SUMMARY

A system is disclosed for commanding a robot by a programmable logic controller, the system comprising: a programmable logic controller; at least two function blocks with at least one input configured to trigger an execution of a programmable logic controller function block and at least one output configured to indicate a status of the function block, and wherein each function block corresponds to a movement segment of a movement path of a robot to be commanded; a robot controller interface configured to orchestrate function blocks currently in execution into a robot command; a command queue configured to store the orchestrated robot commands and send them sequentially to the robot, wherein the command queue is configured to keep at least a last executed robot command within a memory within the command queue, and wherein the command queue is configured to store information, which includes whether a robot command has not yet been executed, is currently in execution or has been executed; and wherein the system is configured to control a backwards motion of the robot along a movement path by stopping the execution of not yet executed robot commands for forward motion and by sequentially resending the at least one executed robot command stored in the command queue in a contrawise sequence to the robot via the programmable logic controller.

A method is disclosed for commanding a robot using a system including a programmable logic controller, at least two function blocks with at least one input configured to trigger an execution of a programmable logic controller function and at least one output configured to indicate a status of a function block, and wherein each function block corresponds to a movement segment of a movement path of a robot to be commanded, a robot controller interface configured to orchestrate the function blocks currently in execution into a robot command, and a command queue configured to store orchestrated robot commands and send them sequentially to the robot, the method comprising: temporarily switching the system into an operational mode; sequentially orchestrating robot commands into the command queue; sequentially sending the robot commands to the robot; sequentially executing the robot commands by the robot; stopping the orchestrating, sending and execution of the robot commands; switching the system into a backwards motion mode; temporarily deleting the orchestrated, but not yet executed robot commands within the command queue; automatically identifying a last executed robot command within the command queue; sequentially resending at least a part of the executed robot commands stored in the command queue in a contrawise sequence to the robot via the programmable logic controller; temporarily acknowledging, before resending, a robot command; backwards executing a robot command by the robot; temporarily deleting the executed robot command, which has been resent, from the command queue; switching the system back to the operational mode; and restarting normal operational mode from the actual robot position.

BRIEF DESCRIPTION OF THE DRAWINGS

The disclosure is explained below with reference to the exemplary embodiments, shown in the drawings. In the drawings.

DETAILED DESCRIPTION

Figure 1:
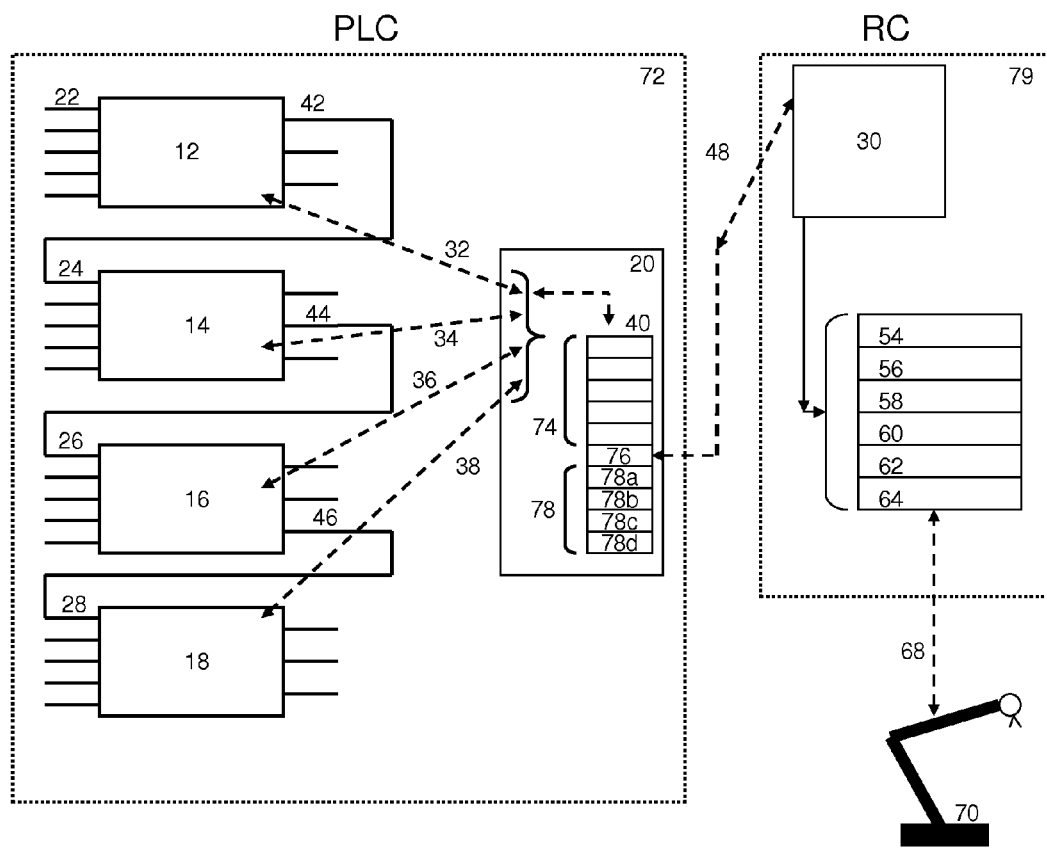
FIG. 1 shows an exemplary system for commanding a robot by PLC.

An exemplary system for commanding a robot by a programmable logic controller (PLC) can include at least two function blocks with at least one input for triggering an execution of a belonging PLC function and at least one output indicating the status of the belonging function block, whereas each function block corresponds to a movement segment of a movement path of the robot to be commanded, a robot controller interface which orchestrates the function blocks currently in execution into a robot command, whereas the function blocks are linked sequentially, so that the execution of a subsequent function block is triggered by the output of the preceding function block, whereas the orchestrated robot commands are applicable to a robot controller and whereas the robot controller interface is prepared to receive a feedback signal of the robot controller, which influences the output status of the belonging function block.

In accordance with an exemplary embodiment, the disclosure provides a PLC based system for controlling or commanding a robot, which can also be suitable for backwards motion.

In accordance with an exemplary embodiment, the system can include a command queue, which can keep at least the lastly executed robot command within its memory, and wherein the command queue can store additionally the information, whether a robot command has not yet been executed (waiting), is currently in execution (active) or has been executed (done) and that the system can control a backwards motion of the robot along the movement path by stopping the execution of not yet executed robot commands for forward motion and by sequentially resending at least one executed robot command stored in the command queue in a contrawise sequence to the robot by using the PLC.

In accordance with an exemplary embodiment, the disclosure discloses keeping the already executed robot commands, which execution can be reported from the robot controller to the PLC, within the command queue. Those commands can, for example, be eliminated from the command queue after their execution. Each robot command can correspond to a certain movement segment of the movement path such as a linear section, a curve or a circle segment. Thus, the history of the lastly executed movement path can be stored within the command queue, providing the frame coordinates for a backwards motion along the same path. For this reason, each robot command can be assigned within the command queue to one of the three states "waiting", "active" and "done". At minimum one executed robot command with the status "done" can be provided within the command queue to have sufficient data for a backwards motion. For example, a larger number of executed robot commands such as 10, 20 or 50 can be stored within the command queue for a longer backwards motion.

According to the disclosure, the already executed robot commands from the command queue can be executed again by the robot, but in contrawise sequence. So the function block corresponding to lastly executed robot command can be re-executed first by the PLC. Thus in the next PLC cycle the belonging function block can be triggered again and the belonging robot command can be orchestrated in the command queue for further backwards execution by the robot respectively the robot controller. Afterwards the second to last executed robot command can be executed in the same way and so on. For example, only one robot command for backward execution can be currently within the command queue respectively and also the motion queue of the robot controller, so that the procedure for a second backwards motion command can be started, when the procedure for the first backwards motion command has been completed. Thus, a PLC based robot control can be enabled for backward motion.

In accordance with an exemplary embodiment, a dedicated operation mode for backward motion is disclosed. This can be initialized by a tech-pendant for manually interaction, for example, which can be used for a robot. A teach pendant can enable the operator to be close to the robot while the robot can be taught or moved backwards. A backward operation mode can be initialized by pressing a certain button of the teach pendant to prohibit an unintentional backward movement. For example, the backward motion in the belonging mode can be combined with a significant lower movement speed, for example by a factor of ten, than the movement speed according to the robot program. Background can reduce the risks of collisions respectively to increase the reaction time for the operator to stop the robot movement in case of an upcoming collision.

According to an exemplary embodiment of the disclosure, an executed robot command can be acknowledged before resending to the robot respectively before re-orchestrating the robot command of the belonging function block into the command queue. The acknowledgement of each robot command respectively the belonging movement segment before its individual execution can reduce the risk of collisions or other dangerous situations while moving backwards.

For example, all not yet executed robot commands for forward motion can be deleted from the command queue in case of an intended backward motion. Those commands can be orchestrated into the command queue in expectance of the normal execution of the motion program, which however has been interrupted. After having finished the backwards motion and resuming the robot program, those robot commands can again be re-orchestrated into the command queue so the previously orchestrated and not yet executed robot commands can be useless. Moreover, they are complicating the orchestrating and execution of the robot commands for backward motion.

According to an exemplary embodiment of the disclosure, the robot can include an internal backward motion functionality, which can be addressed for backwards motion along the path of an incompletely executed movement segment. For example, this can be useful when the forward execution of the robot program has been interrupted while a robot command was currently in execution so that the robot has brought to stop in between the starting and end point of a movement segment.

The reason for using the backward motion functionality of a robot in case that the robot did not exactly stop on the start- or end-coordinates of a movement segment can be that the PLC based control system does not know the exact stop position of the robot. Moreover, the control system can execute either complete movement segments or incomplete linear movement segments in inverse direction. Hence, for example, for using the backwards motion functionality of the robot, which can be a curved movement segment. Thus, in those cases it is easier to use an existing backwards motion functionality of the robot to move backwards. After having reached the end-coordinate of the preceding complete movement segment the PLC based backward motion control can be addressed for further backwards motion.

In accordance with an exemplary embodiment of the disclosure, a request for backwards motion can be only executable, if at least one executed robot command is available within the command queue, which has not yet been resend to the robot. For example, such a request might be triggered by a teach pendant for controlling a stepwise backwards motion. In case that such a backwards motion is not possible, for example, since the execution of the robot program has not yet been started and no executed robot command is stored within the command queue, the execution of such a request can be denied by the system.

In an exemplary embodiment, coordinate data of the starting and/or end point of a movement segment represented by an already executed robot command can be swapped before resending it to the robot respectively before re-execution of the belonging function block and re-orchestrating the belonging robot command into the command queue. For example, for backwards motion only one robot command shall be currently within the command queue. The next robot command for backwards motion can only be released for orchestrating in the command queue, when the preceding backwards robot command has been executed.

A movement segment corresponds to a path segment, which can be characterized by a starting coordinate, an end coordinate and a certain rule how to move in between those coordinates. For example, a coordinate for a robot with six or more degrees of freedom in movement can include six values, three for the position in the three dimensional space and three for the orientation. A rule how to move can correspond to a robot command and can determine, whether the motion is linear, along a curve or along a circle segment or such. Since the motion along a movement segment can be directed, it can be desirable to swap the starting and end coordinates to gain a homogenous backwards motion.

In accordance with an exemplary embodiment, coordinate data of the starting point of a movement segment can be represented by the coordinate data of the end point of the preceding movement segment. For example, all movement segments can be homogenously linked together so that the coordinates can be over-redundant. In some cases, the robot commands only use an end position since the current position is seen as the starting point for the movement. Thus, the number of coordinate data associated with the robot commands can be reduced by assigning only the end coordinate of the movement to the robot command. For example, this can also be considered for the coordinate swap within the backward motion.

According to an exemplary embodiment of the disclosure, the command queue can be organized in the kind of a shifting register or a ring buffer, so that the oldest robot command can be overwritten by the belonging newest robot command. Dependent on the overall storage capability of the command queue the length of the buffer for the storage of already executed robot commands can correspond to the difference of the length of the command queue to the number of robot commands, which can be orchestrated in advance into the command queue including the robot command, which can be currently in execution. So the complete currently free storage capacity of the command queue can be used as buffer for the storage of the already executed robot commands.

In accordance with an exemplary embodiment of the disclosure, an executed robot command within the command queue can be deleted after resending. Since this robot command will not be re-used after resending it is useless data within the command queue which might be hindering for the further execution of the backwards motion. Thus, according to exemplary embodiments of the disclosure, only robot commands, which might be required for the further preceding of the robot program, are provided within the command queue.

In accordance with an exemplary embodiment, the programmable logic controller and a robot controller for the robot to be commanded can be integrated within a common data processing device, which can reduce the amount of hardware. Thus, the robot controller itself which can be delivered together with the robot can include the PLC functionality. For example, both controller functionalities as a software function can be provided on the same hardware platform or can be provide on different hardware platforms in the same cabinet.

In accordance with an exemplary embodiment, a method for commanding a robot using a system is disclosed, including the steps of temporarily switching the system into a operational mode, sequentially orchestrating robot commands into the command queue, sequentially sending the robot commands to the robot, sequentially execution of the robot commands by the robot, stop orchestrating, sending and execution of the robot commands, switching the system into a backwards motion mode, temporarily deleting the orchestrated, but not yet executed robot commands within the command queue, automatic identifying of the lastly executed robot command within the command queue, sequentially resending at least a part of the executed robot commands stored in the command queue in a contrawise sequence to the robot by using PLC, temporarily acknowledge before resending a robot command, backwards execution of the belonging robot command by the robot, temporarily deleting the executed robot command, which has been resend, from the command queue, switching the system back to the operational mode, restarting normal operational mode from the actual robot position.

In accordance with an exemplary embodiment, some of the features mentioned in this method can be optionally, for example, all features with "temporarily" but also the features concerning a dedicated operational and backwards motion mode.

But also additional features can be within the scope of the disclosure, for example, the automatic identifying of the robot command which was currently in execution when the system has been stopped. This can be used for a backward motion of the robot to the end coordinates of the last preceding movement segment by using a backward motion functionality of the robot itself.

FIG. 1 shows an exemplary system 10 for commanding a robot by PLC. The programmable logic controller 72 can include four exemplary function blocks 12, 14, 16, 18, which can be sequentially connected. The execution of the first function block 12 can be triggered by its input 22, for example, by an external manual signal. The first output 42 of the function block can be connected to the trigger input 24 of the subsequent function block 14. The first output 42 indicates in its TRUE state, that the execution of the function block 12 has been started. Thus the subsequent second function block 14 can be executed immediately after starting the preceding block 12. So the belonging robot commands can be orchestrated rather simultaneously by the robot controller interface 20 into real robot commands. Both orchestrated commands can be applied to the robot controller 79, which can include a motion queue for sequentially storing the robot- respectively motion commands.

A data connection line 48, which can be a fieldbus, which can be in between the programmable logic controller 72 and a robot controller 79. For example, the programmable logic controller and the robot controller can be software modules on the same hardware platform, and wherein the connection line 48 corresponds to a data exchange between the software modules. The command queue can either be part of the programmable logic controller 72 itself, for example, as indicated with reference sign 40 in this example, but it can also be integrated into an optional PLC interface 30, which can coordinate the communication with the programmable logic controller 72.

Apart from the command queue 40 on the PLC side for storing orchestrated robot commands, can include an additional motion queue on the robot controller 79 side for storing the belonging motion commands. Thus, the command queue 40 on the PLC side can contain codes for robot commands and not directly the robot commands themselves. Those codes, which might be some numbers for example, can be easier to handle. The optional PLC interface 30 translates those codes into the relevant robot commands 54, 56, 58, 60, 62, 64 and provides them to the robot controller internal motion queue.

The robot controller 79 can include a computing device with the ability to store and execute a robot movement program. For example, the orchestrated motion commands 54, 56, 58, 60, 62, 64 can be sequentially integrated into a motion queue of the executable robot program, so that the robot 70 executes sequentially those commands.

A third function block 16 can be triggered with its trigger input 26 by the second output 44 of the second movement block 14. The second output 44 encodes the second state, namely that the execution of the relevant movement segment has been started. Thus, the robot command corresponding to the third function block 16 can be orchestrated into the command queue after the robot 70 has started the execution of the movement segment corresponding to the second function block 14. The information that the execution has already been started has been provided by the communication line 48 from the robot controller 79 to the programmable logic controller 72 in the meanwhile.

A fourth function block 18 can be triggered with its trigger input 28 by the third output 46 of the third function block 16. The third output 46 can encode the third state, namely that the execution of the movement segment corresponding to the third movement block 16 has been finished. Thus, the relevant robot command cannot be orchestrated into the command queue until all previous commands within the command queue have been executed by the robot 70. Therefore the robot motion will stop before the execution of the last robot command. For example, the data communication lines 32, 34, 36, 38 can be realized by a pure data exchange within the programmable logic controller 72, for example by variables. If the programmable logic controller would have been realized by a dedicated physical hardware and not by a software module, those data communication lines would be real physically existing lines.

The command queue 40 of the programmable logic controller 72 can be organized in the kind of a shifting register. Thus, the orchestrated robot commands can be fed in sequentially at one end of the command queue 40, in this sketch at the top. Those robot commands, which are in a "waiting" state since they are not yet executed, are stored within the area 74 of the shifting register. The length of the area 74 can be variable, depending on how many robot commands in advance are orchestrated into the command queue. The command, which can be currently in execution and is in "active" state, can be currently stored within the area 76. The physical allocation of the area 76 can vary dependent on the number of not yet executed robot commands, which are stored in the area 74. Each robot command can be associated with its current status within the command queue 40.

According to the disclosure the already executed robot commands with "done" state can be stored respectively kept within the area 78 of the shifting register respectively within the command queue. According to known art, the already executed robot commands would have been eliminated from the command queue 40. Thus, by storing the executed robot commands, history information of previously robot motion can be provided.

In case of a system stops, the robot stops motion and the robot commands according to the regular robot program are no longer orchestrated into the command queue. Afterwards the robot can be switched into a backwards motion mode. Thus, the not yet executed robot commands within the area 74 of the command queue respectively the shifting register will be eliminated since they are useless data. Subsequent the robot command, which was currently in execution during the system stop, can be automatically determined within the area 76.

Then a robot command can be sent to the robot 30 robot controller 79 for moving the robot to the end coordinates of the movement segment corresponding to the lastly executed robot command, which is marked in the figure with reference sign 78a. In accordance with an exemplary embodiment, the backwards motion functionality of the robot itself can be applied since in this example the system for commanding a robot by PLC can be only to perform complete movement segments in backward motion.

In the next step the starting and end coordinates of the movement segment corresponding to the lastly executed robot command 78a can be swapped and the relevant function block can be re-executed whereas the relevant robot command is re-orchestrated in the command queue 40. After an acknowledgement by an operator, the command can, for example, be sent to the robot 70 robot controller 79 and executed as backward motion by the robot 70. Optionally, the second to last executed robot command 78*b* and afterwards the third to last 78*c* and fourth to last 78*d* robot commands can be handled in the same way.

After finishing the backwards motion the system can be switched back to regular operational mode. Then the program can be resumed from the actual position of the robot along the programmed path as described before, namely by executing the relevant function blocks, orchestrating the relevant robot commands into the command queue and executing the commands by the robot.

Figure 2:
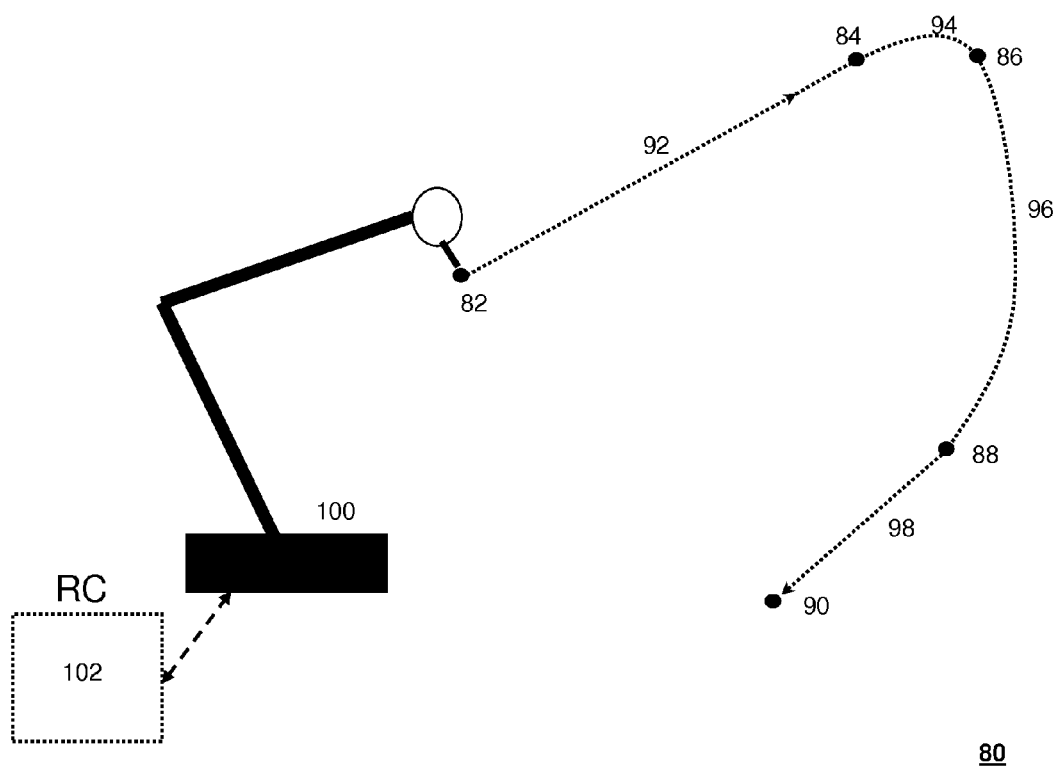
FIG. 2 shows an exemplary robot with movement path.

FIG. 2 shows an exemplary robot with movement path in a sketch 80. A robot 100 can be connected to a robot controller 102, which can be connected to a not shown programmable logic controller. According to the intended movement path the robot 100 will move along a movement path defined by the coordinates 82, 84, 86, 88, 90 which build the movement segments 92, 94, 96 and 98 in between them. Each coordinate 82, 84, 86, 88, 90 can include at least including six coordinate values, three for the coordinates in the XYZ directions and three for the orientation, and whereas each coordinate can also include configuration data for the robot. For example, a robot can be commanded with less degree of freedom in movement by a programmable logic controller according to the disclosure.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 10 exemplary system for commanding a robot by PLC
12 first function block
14 second function block
16 third function block
18 fourth function block
20 robot controller interface
22 trigger input of first function block
24 trigger input of second function block
26 trigger input of third function block
28 trigger input of fourth function block
30 PLC interface
32 first data communication line
34 second data communication line
36 third data communication line
38 fourth data communication line
40 command queue
42 first output of first function block
44 second output of second function block
46 third output of third function block
48 fifth data communication line
54 first robot command
56 second robot command
58 third robot command
60 fourth robot command
62 fifth robot command
64 sixth robot command
68 control line to robot
70 first robot
72 programmable logic controller
74 robot commands not yet executed
76 robot command in execution
78 executed robot commands
78*a* lastly executed robot command
78*b* second to last executed robot command
78*c* third to last executed robot command
78*d* fourth to last executed robot command
79 first robot controller
80 exemplary robot with movement path
82 first coordinate of movement path
84 second coordinate of movement path
86 third coordinate of movement path
88 fourth coordinate of movement path
90 fifth coordinate of movement path
92 first movement segment
94 second movement segment
96 third movement segment
98 fourth movement segment
100 second robot
102 second robot controller

What is claimed is:

1. A system for commanding a robot by a programmable logic controller, the system comprising:
    a programmable logic controller;
    at least two function blocks with at least one respective input configured to trigger an execution of a programmable logic controller (PLC) function block and at least one respective output configured to indicate a status of the respective function block, and wherein each function block corresponds to a movement segment of a programmed movement path of a robot to be commanded;
    a robot controller interface configured to orchestrate a PLC function block currently in execution into a robot command;
    a command queue configured to store the respective orchestrated robot commands and for sending them sequentially to the robot for sequentially execution, wherein the command queue is configured to keep at least a last executed robot command within a memory within the command queue, and wherein the command queue is configured to store information, which includes whether a robot command has not yet been executed, is currently in execution or has been executed;
    wherein the system is configured to control a backwards motion of the robot along a movement path by stopping the execution of not yet executed robot commands for forward motion and by sequentially resending the at least one executed robot command stored in the command queue in a contrawise sequence to the robot via the programmable logic controller; and
    the system is foreseen to delete all not yet executed robot commands for forward motion from the command queue in case of a backward motion.

2. The system according to claim 1, comprising:
    an operation mode for backward motion.

3. The system according to claim 1, wherein an executed robot command is acknowledged before resending the command to the robot.

4. The system according to claim 1, wherein in combination with a robot which comprises:
    an internal backward motion functionality, which is configured to address backwards motion along a path of an incompletely executed movement segment.

5. The system according to claim 1, wherein a request for backwards motion is only executable when at least one executed robot command is available within the command queue which has not yet been resent to the robot.

6. The system according to claim 1, wherein the programmable logic controller is configured to:
swap coordinate data of a starting and/or an end point of a movement segment represented by an already executed robot command before resending the command to the robot.

7. The system according to claim 6, wherein the coordinate data of the starting point of the movement segment are represented by coordinate data of the end point of a preceding movement segment.

8. The system according to claim 1, comprising:
a shifting register or a ring buffer, wherein the command queue is organized in the shifting register or the ring buffer, such that an oldest robot command is overwritten by a newest robot command.

9. The system according to claim 1, wherein the programmable logic controller is configured to delete an executed robot command within the command queue after resending.

10. The system according to claim 1, comprising:
a common data processing device, wherein the programmable logic controller and a robot controller for the robot to be commanded are integrated within the common data processing device.

11. A method for commanding a robot using a system including a programmable logic controller, at least two function blocks with at least one respective input configured to trigger an execution of a programmable logic controller (PLC) function and at least one respective output configured to indicate a status of a respective function block, and wherein each function block corresponds to a programmed movement segment of a movement path of a robot to be commanded, a robot controller interface configured to orchestrate a PLC function block currently in execution into a robot command, and a command queue configured to store respective orchestrated robot commands and for sending them sequentially to the robot for sequentially execution, the method comprising:
temporarily switching the system into an operational mode;
sequentially orchestrating robot commands into the command queue;
sequentially sending the robot commands to the robot;
sequentially executing the robot commands by the robot;
stopping the orchestrating, sending and execution of the robot commands;
switching the system into a backwards motion mode;
temporarily deleting the orchestrated, but not yet executed robot commands within the command queue;
automatically identifying a last executed robot command within the command queue;
sequentially resending at least a part of the executed robot commands stored in the command queue in a contrawise sequence to the robot via the programmable logic controller;
temporarily acknowledging, before resending, a robot command;
backwards executing a robot command by the robot;
temporarily deleting the executed robot command, which has been resent, from the command queue;
switching the system back to the operational mode; and
restarting normal operational mode from the actual robot position.

12. The method of claim 11, comprising:
configuring the command queue to keep at least a last executed robot command within a memory within the command queue.

13. The method of claim 12, comprising:
configuring the command queue to store information, which includes whether a robot command has not yet been executed, is currently in execution or has been executed.

14. The method of claim 13, comprising:
configuring the system to control backwards motion of the robot along a movement path by stopping execution of not yet executed robot commands for forward motion.

* * * * *